Jan. 22, 1929.  J. M. HOTHERSALL  1,699,698
LUNCH KIT
Filed June 1, 1925   2 Sheets-Sheet 1

INVENTOR
John M. Hothersall
BY: Munday, Clarke
& Carpenter
ATTORNEYS

Jan. 22, 1929.  J. M. HOTHERSALL  1,699,698
LUNCH KIT
Filed June 1, 1925    2 Sheets-Sheet 2
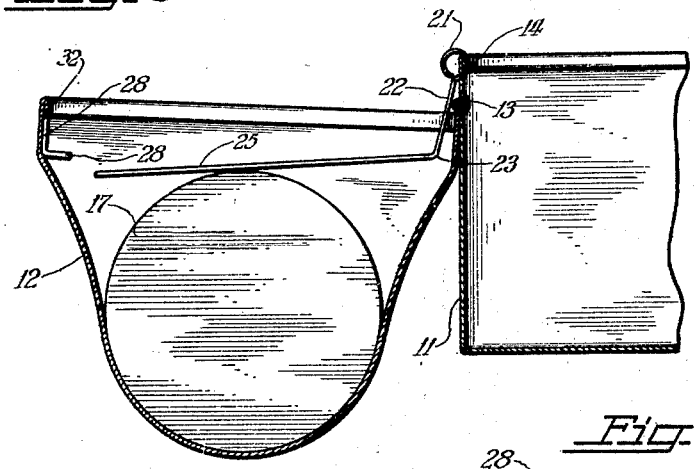
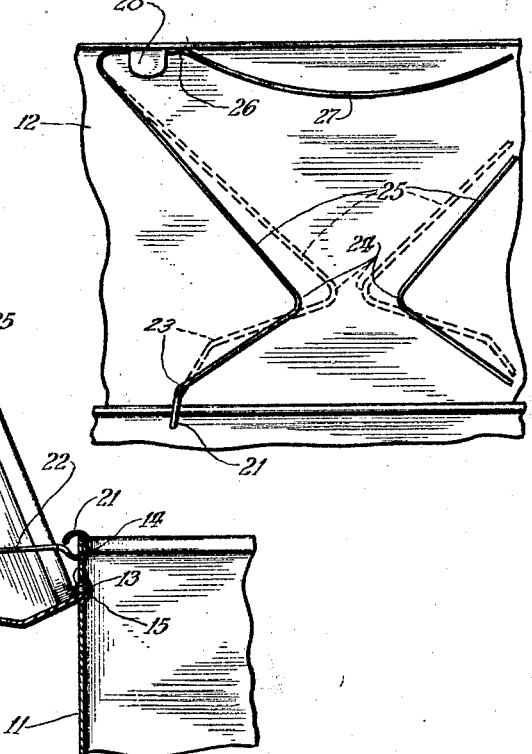
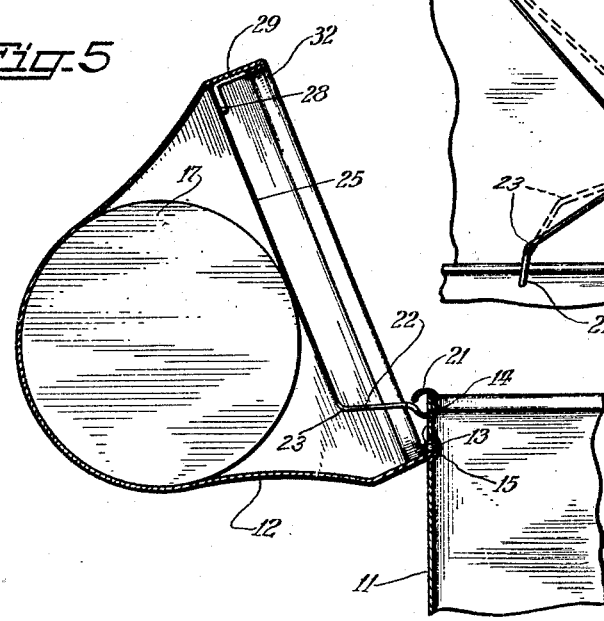
INVENTOR
John M. Hothersall
BY: Munday, Clarke
& Carpenter
ATTORNEYS Patented Jan. 22, 1929.

1,699,698

UNITED STATES PATENT OFFICE.

JOHN M. HOTHERSALL, OF BROOKYLN, NEW YORK, ASSIGNOR TO AMERICAN CAN COMPANY, OF NEW YORK, N. Y., A CORPORATION OF NEW JERSEY.

LUNCH KIT.

Application filed June 1, 1925. Serial No. 33,992.

This invention relates to lunch kits, and more particularly to an improvement in the means provided in such receptacles for holding a thermos bottle, or like article, in the cover of the kit.

An important object of the invention is the provision, in a lunch kit, of thermos bottle retaining means conveniently mounted and automatically operable by the act of closing the container to clamp the thermos bottle in the top of the cover and to positively support the same out of contact with the food in the kit when the latter is closed.

Numerous other objects and advantages of the invention will be apparent as it is better understood from the following description, which, taken in connection with the accompanying drawings, discloses a preferred embodiment thereof.

Referring to the drawings.

Figure 1:
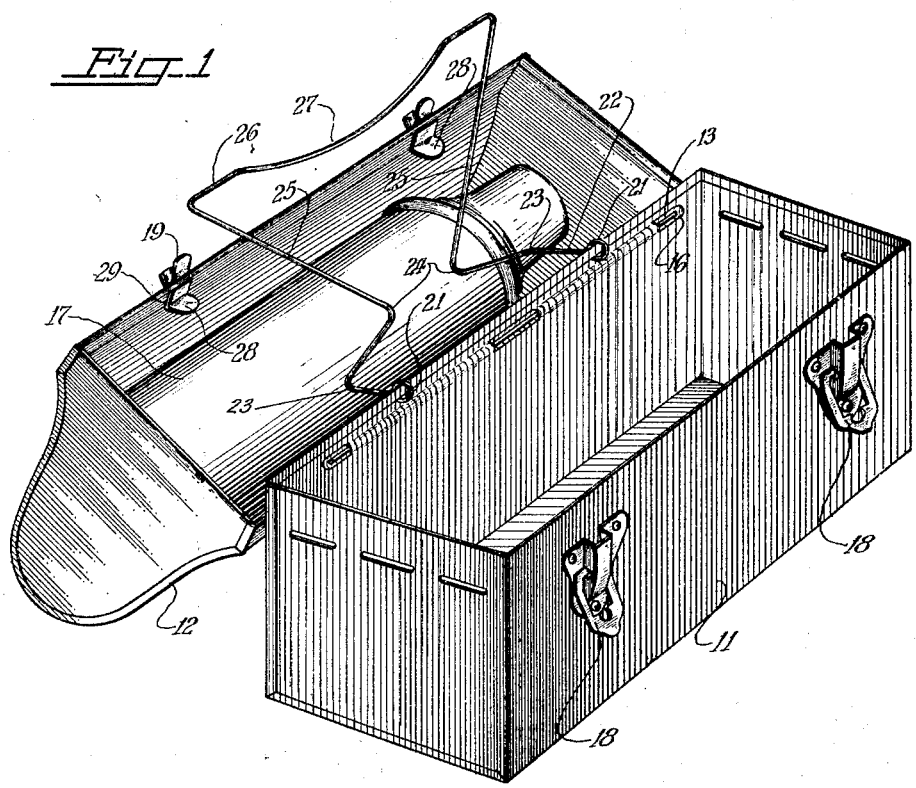
Figure 1 is a perspective view of a lunch kit provided with a thermos bottle retaining member made according to my invention, the cover being shown in open position and containing a thermos bottle, and the retaining member being arranged in position for insertion or removal of the thermos bottle.

Figs. 3 and 5 are similar views, showing the cover in open and partially closed position, respectively, and illustrating the position of the retaining member prior to and during the closing of the cover; and Fig. 4 is a plan view of the interior of the cover, showing the action of the retaining member during the closing operation, the position before the retaining member is flexed being shown in full lines and the final position being shown in dotted lines.

On said drawings, I have shown, for illustrative purposes only, a lunch kit having an oblong body 11, to which a cover 12 is hinged by means of a pintle 13 and hinge lugs 14 on the cover, said pintle being disposed in oppositely opening channels 15 and 16 formed in the rear wall of said body and the lugs being wrapped around outside portions thereof. Said cover is of campanulate form, in cross-section, and is adapted to receive a thermos bottle 17, fitting snugly within the curved top portion thereof. Said body and cover are provided with coacting clasp members 18 and 19 to fasten the cover in closed position, and the thermos bottle is adapted to be held in the cover and out of contact with the food in the kit by means of a retaining member, which will now be described.

Said member is preferably made of spring wire, looped at its ends, as indicated at 21, and pivotally engageable with the top of the rear wall of said body 11. Said loops 21 are formed in the ends of arms 22, which are bent at 23, both at an angle to the plane of the parts thereof in which the loops 21 are formed and towards each other to points of bend 24, from which they diverge to form supporting portions 25, connected at their forward ends by a cross portion 26, bowed inwardly in the central part thereof, as indicated at 27, and providing straight portions at its opposite ends engageable with inwardly projecting lugs 28 on the free or unhinged side of the cover forming a ledge for the support of the retaining member. Said lugs 28, as shown, are of right angle formation, having a portion 29 arrangeable in contact with and attachable to a vertical lower part 31 of the wall of the cover above an edge portion 32 bent upwardly in contact with the interior of the vertical wall 31. Obviously, said lugs may be secured in place by welding, or in any preferred manner, or may be formed integrally with the cover.

In positioning a thermos bottle, or other article to be held in the cover, the same may be arranged therein with the cover open, as shown in Figs. 1 and 3, and the holder or retaining member dropped into position above said bottle, assuming the position shown in said Fig. 3. The cover may then be raised, which tends to shorten the distance between the pivots of said member and the free or unhinged side of the cover and thereby causing the free end of said member to move into position above the lugs 28 (see Fig. 5). Further closing movement of said cover tends to move the points 24 toward each other from the full line position to the dotted line position of Fig. 4, this movement also flexing the retaining member at the points of bend 23 and 24 in a vertical direction, thereby clamping the bottle 17 tightly against the top of the cover, the final position being illustrated in Fig. 2 of the drawings. This clamping action is entirely automatic and invariably accompanies the closing of the cover. The lug 28 swings on a longer radius (from the pivot 13) than does the retaining member from the edge of the box.

Figure 2:
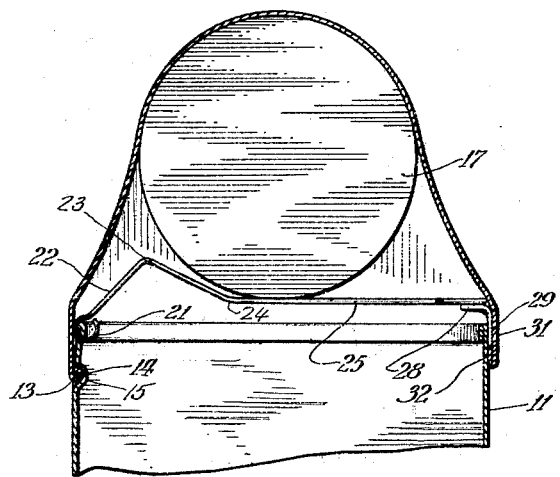
Fig. 2 is a fragmentary cross-sectional view of the kit with the cover closed.

As seen in Fig. 2 the closed cover forces the retaining member towards and further over the lugs 28, and in its final clamping position the said member is compressed horizontally and somewhat collapsed, as shown by the dotted lines in Fig. 4.

It is thought that the invention and many of its attendant advantages will be understood from the foregoing description, and it will be apparent that various changes may be made in the form, construction and arrangement of the parts, without departing from the spirit and scope of the invention, or sacrificing all of its material advantages, the form hereinbefore described being merely a preferred embodiment thereof.

I claim:

1. A lunch kit, comprising a body, a cover hinged thereto, and means for retaining a thermos bottle, or like article, in said cover, said means comprising a member pivoted to the top edge of the side of the body to which said cover is hinged and lugs on the free or unhinged side of said cover automatically engageable by said member during closing movement of the cover, said member having a clamping action upon the bottle during said closing movement.

2. A lunch kit, comprising a body, a cover hinged thereto, and means for retaining a thermos bottle, or like article, in said cover, said means comprising a pivotally mounted member and lugs on the free or unhinged side of said cover automatically engageable by said member during closing movement of the cover, said member having a clamping action upon the bottle during said closing movement.

3. A lunch kit, comprising a body, a cover hinged thereto, and means for retaining a thermos bottle, or like article, in said cover, said means comprising a pivotally mounted member and lugs on the free or unhinged side of said cover automatically engageable by said member during closing movement of the cover.

4. A lunch kit, comprising box parts hinged together and one thereof being adapted to contain a thermos bottle, or like article, a retaining member pivoted to one of said box parts, and means on the interior of the kit automatically engageable by said member to support the same as the kit is being closed, the distance between said means and the pivot of said member being shortened during said closing movement, whereby said member is caused to have a clamping action upon the bottle when the box parts are in closed relation.

5. A lunch kit, comprising a body, a cover hinged thereto, and means for retaining a thermos bottle or like article in said cover, said means including means providing a ledge on the unhinged side of said cover, and means pivoted to said body at a distance from the axis of the cover hinge and adapted to engage the ledge during closing movement of the cover and said ledge being moved away from the retaining means when the cover is lifted.

6. A lunch kit, comprising a body, a cover hinged thereto, and means for retaining a thermos bottle or like article in said cover, said means comprising lugs on an unhinged side of said cover, and a member adapted to engage said lugs and pivoted to the body at a distance from the axis of the cover hinge and said lugs being moved away from said retaining means when the cover is lifted.

7. A lunch kit, comprising a body, a cover hinged thereto, and means for retaining a thermos bottle or like article in said cover, said means comprising lugs on an unhinged side of said cover, and a member adapted to engage said lugs, and having a pivot connection with said body toward which connection said lugs are caused to approach by the hinging and closing movement of the cover.

JOHN M. HOTHERSALL.